US012769053B2

(12) United States Patent
Zhang et al.

(10) Patent No.: US 12,769,053 B2
(45) Date of Patent: Oct. 20, 2026

(54) OPTICAL PHASED ARRAY CHIP WITH CONTRA-DIRECTIONAL COUPLER, OPTICAL PHASED ARRAY SYSTEM AND ON-CHIP PHASE CALIBRATION METHOD

(71) Applicant: SILITH TECHNOLOGY PTE. LTD., Singapore (SG)

(72) Inventors: Xingyu Zhang, Shanghai (CN); Guangzhu Zhou, Shanghai (CN); Zhexuan Zheng, Shanghai (CN)

(73) Assignee: SILITH TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 19/547,624

(22) Filed: Feb. 23, 2026

(65) Prior Publication Data

US 2026/0186202 A1 Jul. 2, 2026

Related U.S. Application Data

(63) Continuation of application No. PCT/CN2024/078340, filed on Feb. 23, 2024.

(30) Foreign Application Priority Data

Nov. 3, 2023 (CN) ......................... 202311450751.9

(51) Int. Cl.
*G02B 6/12* (2006.01)
*G02F 1/01* (2006.01)

(52) U.S. Cl.
CPC ...... *G02B 6/12019* (2013.01); *G02B 6/12011* (2013.01); *G02B 6/12014* (2013.01);
(Continued)

(58) Field of Classification Search
CPC .. G02B 6/12; G02B 6/12019; G02B 6/12011; G02B 6/12014; G02B 6/12033; G02F 1/0147
See application file for complete search history.

(56) References Cited

U.S. PATENT DOCUMENTS 11,709,318 B1 * 7/2023 Jain .................... G02B 6/12011
385/37
2021/0294032 A1 * 9/2021 Zeng ..................... G02F 1/0147

FOREIGN PATENT DOCUMENTS

EP 3816658 A1 * 5/2021 ........... G01S 7/4814

* cited by examiner

*Primary Examiner* — Tina Wong
(74) *Attorney, Agent, or Firm* — JCIPRNET

(57) ABSTRACT

Provides optical phased array chip with contra-directional coupler, system and calibration method, applied to saving chip size. Optical phased array chip comprises: m levels of beam splitting section, each comprises optical splitter group and optical waveguide branch group; m-th level of optical waveguide branch group comprises N paths of first optical waveguide branch, configured to transmit an N-channel output signal; each path of first optical waveguide branch has a thermo-optical phase shifter arranged, end of each path of optical waveguide branch has an emitting element connected; upper layer or lower layer of each path of optical waveguide branch has at least one contra-directional coupler arranged, contra-directional couplers in two paths of first optical waveguide branch combine light by two paths of second optical waveguide branch and form an interferometer structure, configured to transmit an optical signal after being combined and interfered to a detector for phase calibration.

10 Claims, 11 Drawing Sheets

(52) U.S. Cl.
CPC ....... *G02B 6/12033* (2013.01); *G02F 1/0147* (2013.01); *G02B 2006/12107* (2013.01); *G02B 2006/12135* (2013.01); *G02B 2006/12147* (2013.01); *G02B 2006/1215* (2013.01); *G02B 2006/12159* (2013.01)

OPTICAL PHASED ARRAY CHIP WITH CONTRA-DIRECTIONAL COUPLER, OPTICAL PHASED ARRAY SYSTEM AND ON-CHIP PHASE CALIBRATION METHOD

CROSS-REFERENCES TO RELATED APPLICATION

This application is a continuation of international application of PCT application serial no. PCT/CN2024/078340, filed on Feb. 23, 2024, which claims the priority benefit of China application no. 202311450751.9 filed on Nov. 3, 2023. The entirety of each of the above mentioned patent applications is hereby incorporated by reference herein and made a part of this specification.

FIELD OF THE APPLICATION

The present application relates to the technical field of optical phased array, and in particular to an optical phased array chip with a contra-directional coupler, a system and a calibration method thereof.

BACKGROUND

An Optical Phased Array (OPA) chip has been applied in a plurality of fields including a laser radar, imaging, a free-space optical communication, a laser ranging, and more. The optical phased array can be implemented by a plurality of methods including using a liquid crystal, a micro-electro mechanical systems (MEMS) device, an optical waveguide, and more. Wherein a waveguide optical phased array, due to having a plurality of characteristics including a fast response speed, a low control voltage, a large scanning angle, convenience for a large-scale integration and more, has been widely concerned and applied in recent years In order to reduce a beam divergence angle without sacrificing a rotating angular range of the OPA and increase a total aperture size of the OPA, a designer has to increase the number of the optical waveguides in the OPA as much as possible. While an OPA with a large number of waveguides requires a longer optical waveguide for an optical routing, thus a phase error caused by a waveguide size, an etching contour, a roughness, a material density, a defect and more, will be more obvious, further reducing a beam quality of the OPA. In order to solve a problem caused by the phase error, it is usually necessary to perform a calibration on a relative phase between each emitting element.

The calibration to the OPA measures the beam quality usually through an output beam in a direct imaging. In order to maximize the beam quality, a phase shifter of the OPA will be adjusted according to an iterative optimization algorithm. A disadvantage of such an approach is that an external optical setting is typically required to make the beam form an image, which is difficult to implement in a field use, and if the OPA needs to be recalibrated due to an environmental variation or an aging effect, an intervention will be required.

In order to allow a frequent recalibration and monitoring to the OPA, an on-chip calibration system integrated on a same optical phased array is needed. FIG. 1 illustrates an architecture of an existing integrated optical phased array system. In FIG. 1, a light incident from a left side is finally split into eight paths by an optical splitter before being transmitted by eight paths of waveguides, while each waveguide has one phase shifter arranged. In a phase calibration region, a contra-directional coupler is able to reflect a small portion of the light. The light reflected back by the contra-directional coupler on every adjacent two paths of waveguides is combined by the optical waveguide to form an interferometer structure, and is then transmitted to pass a plurality of waveguide crossings and finally reaches a detector for a calibration. A light, after passing through the contra-directional coupler, continues to transmit and enters the emitting element before being emitted out. In the architecture, a waveguide having the contra-directional coupler arranged and a waveguide having the OPA are on a same layer. In addition, the contra-directional coupler in FIG. 1, together with a light path direction and a working principle of the interferometer formed by the contra-directional coupler are shown in FIG. 2.

A problem of the architecture stated above is that, the contra-directional coupler occupies a certain spacing, limiting a further reduction of a spacing between the emitting elements. However, a smaller spacing between the emitting elements in the OPA is more favorable for increasing the rotating angular range of the OPA. While in the architecture stated above, there must be a certain distance left between the emitting elements to place the contra-directional coupler, thus the rotating angular range is unable to be maximized. In addition, since a certain spacing between the emitting elements must be saved for the contra-directional coupler, an overall size of the OPA is relatively large, which is not helpful to reduce a cost of a chip. Therefore, it is necessary to provide a novel optical phased array chip to solve the problems stated above in the prior art.

BRIEF SUMMARY OF THE APPLICATION

The present disclosure aims to providing an optical phased array chip with a contra-directional coupler, a system and a calibration method thereof, being able to not only realize an on-chip phase calibration, but also have no effect on a spacing between two transmitting units.

In order to achieve the above object, the present disclosure provides an optical phased array chip with a contra-directional coupler, comprising:

m levels of beam splitting section, each level of the beam splitting section comprises an optical splitter group and an optical waveguide branch group; each optical splitter in each level of the optical splitter group is configured to divide an optical signal into an N-channel output signal;

an m-th level of the optical waveguide branch group comprises N paths of first optical waveguide branch, configured to transmit the N-channel output signal; each path of the first optical waveguide branch in the m-th level of the optical waveguide branch group has a thermo-optical phase shifter arranged, and an end of each path of the optical waveguide branch in the m-th level of the optical waveguide branch group has an emitting element connected; an upper layer or a lower layer of each path of the optical waveguide branch in the m-th level of the optical waveguide branch group has at least one contra-directional coupler arranged, the contra-directional couplers in two paths of the first optical waveguide branch combine light by two paths of second optical waveguide branch and form an interferometer structure, and the interferometer structure is configured to transmit an optical signal to a detector for a phase calibration, wherein the first optical waveguide branch and the second optical waveguide branch are locating in different layers in a space.

In a preferred embodiment, each path of the first optical waveguide branch in the m-th level of optical waveguide branch group has a thermo-optical phase shifter arranged; or each path of the first optical waveguide branch in each level of the optical waveguide branch group has a thermo-optical phase shifter arranged.

In another possible embodiment, a position of each contra-directional coupler is close to the emitting element, configured to keep an optical phase detected by the contra-directional coupler consistent with an optical phase actually emitted by the emitting element. Optionally, the contra-directional coupler comprises a grating structure.

In another possible embodiment, the contra-directional coupler comprises at least one of a partially-etched or fully-etched grating, a strip-shaped grating, a sawtooth grating, a nano-beam grating, a photonic crystal grating, and a multi-layer structure grating.

In another possible embodiment, an integrated material platform where the optical phased array chip is located comprises at least one of Bulk Silicon, Silicon-On-Insulator, Silicon-On-Sapphire, Silicon Dioxide, Aluminum Oxide, Indium Phosphide, Lithium Niobate, Barium Titanate and a polymer thereof.

In another possible embodiment, a type of a waveguide in the first optical waveguide branch is a channel waveguide, a ridge waveguide, a slot waveguide, a diffusion waveguide or a photonic crystal waveguide.

In another possible embodiment, a range of a working wavelength of the phased array comprises at least one of a visible light band, an O band, an E band, an S band, a C band, an L band, a U band, and a mid-infrared band.

In a possible embodiment, an implementation form of the optical splitter in the optical splitter group comprises at least one of a Y-shaped branch, a trident branch, a multimode interferometer, a directional coupler, an adiabatic coupler, a bent coupler, a star coupler, a photonic crystal splitter, and a sub-wavelength splitter.

In another possible embodiment, a material of a heating resistor in the thermo-optical phase shifter comprises Titanium Nitride, doped Silicon or Tungsten, and a position of the heating resistor may locate above, below, or on a side of the optical waveguide; and a waveguide routing shape of the phase shifter may be at least one of a straight waveguide, a spiral type, or a folded type.

In a possible embodiment, an implementation form of an optical combiner in the interferometer structure comprises at least one of a Y-shaped branch, a trident branch, a multimode interferometer, a directional coupler, an adiabatic coupler, a bent coupler, a star coupler, a photonic crystal splitter, and a sub-wavelength splitter.

In a possible embodiment, the detector is a semiconductor photodetector, a metal photodetector, a metal-semiconductor photodetector, or an avalanche photodetector.

On a second aspect, the present disclosure further provides a waveguide optical phased array system, comprising a control circuit and a light source, the optical phased array chip according to any one of the first aspect stated above, an optical component system, a mechanical structure component, and a thermal component, the control circuit is connected to the light source, the optical phased array chip, the optical component system, the mechanical structure component, and the thermal component, respectively, configured to control a light emission and an optical phase.

A beneficial effect of the optical phased array chip and system with the contra-directional coupler provided by the present disclosure is as follows: the contra-directional coupler in the optical phased array chip with the contra-directional coupler locates on the upper layer or the lower layer of each path of the optical waveguide branch, that is, the second optical waveguide branch where the contra-directional coupler is located and the first optical waveguide branch of the OPA are not in a same layer, and an arrangement of the contra-directional coupler will not affect the spacing between the transmitting units, thus the spacing between the emitting elements can be arranged as needed, which is possible to achieve an on-chip phase calibration without affecting the spacing between the transmitting units, and beneficial to reduce a size of a chip, and reduce a cost.

On a third aspect, the present disclosure provides an on-chip phase calibration method, comprising: A. setting an initial phase of an emitting element connecting to an end of at least one optical waveguide branch as a reference phase; B. adjusting sequentially a thermal-optical phase shifter in each remaining path of the optical waveguide branches, and detecting an output signal of an interferometer connected to the contra-directional coupler, until a phase of an emitting element in each remaining path of the thermal-optical phase shifters is consistent with the reference phase.

A beneficial effect of the calibration method provided by the present disclosure is that, the present method is able to perform an accurate calibration to a relative phase between each emitting element, solving a problem caused by a phase error.

DETAILED DESCRIPTION OF EMBODIMENTS

Figure 1:
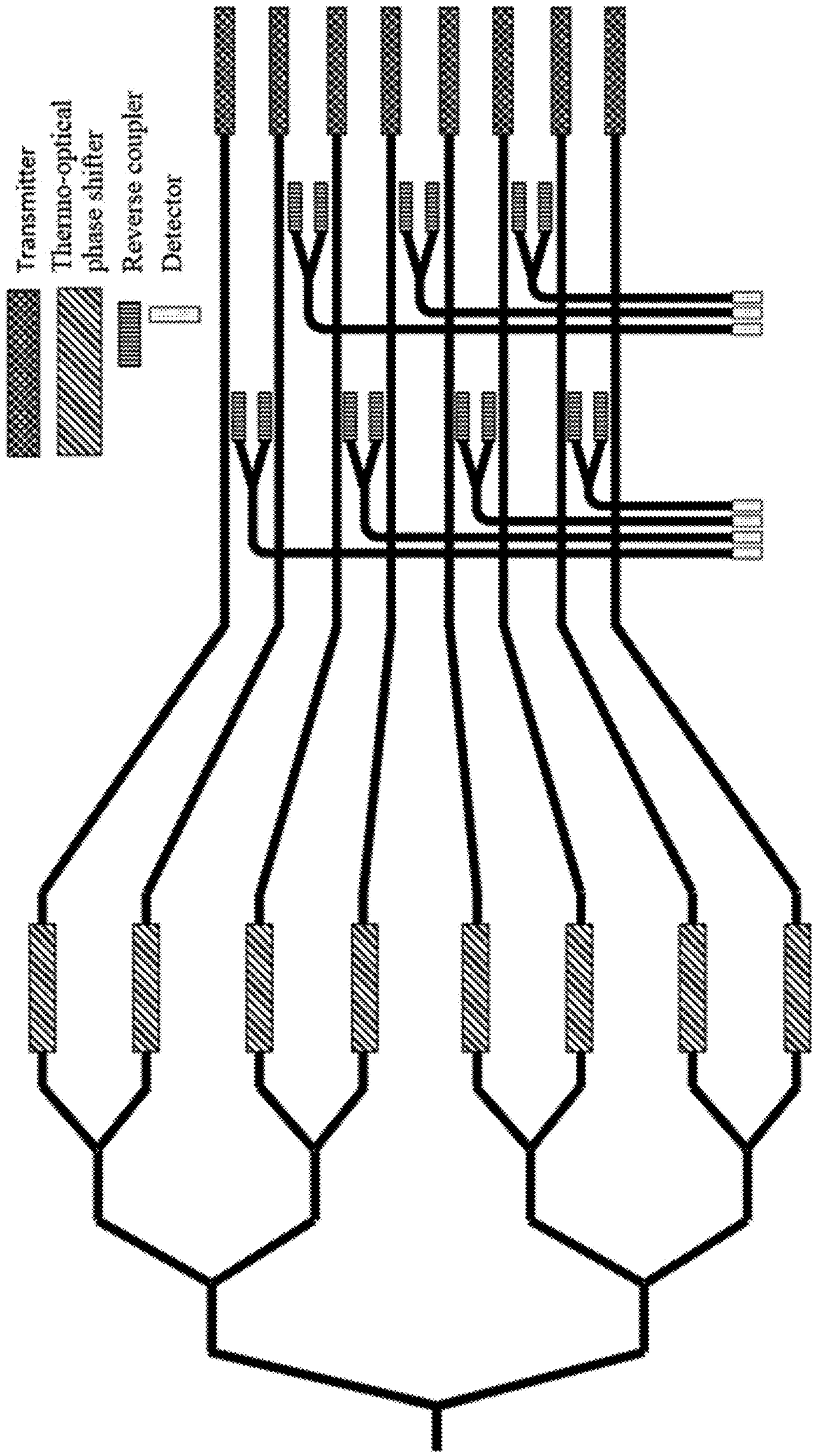
FIG. 1 illustrates a schematic diagram on an optical phased array chip in the prior art.

In order to make the purpose, technical solution and advantages of the present disclosure clearer and more explicit, further detailed descriptions of the present disclosure are stated here, referencing to the attached drawings and some embodiments of the present disclosure. Obviously, the described embodiments are part of, but not all of, the embodiments of the present disclosure. Based on the embodiments of the present disclosure, all other embodiments obtained by those of ordinary skills in the art without any creative work are included in the scope of protection of the present disclosure. Unless otherwise defined, technical or scientific terms used herein should have the meanings usually understood by those of ordinary skills in the art to which the present disclosure belongs. As used herein, the terms "comprise" and the like are intended to mean that an element or item appearing before the term encompasses elements or items appearing after the term and the equivalents thereof, instead of excluding other elements or items.

According to the problems existing in the prior art, a plurality of embodiments of the present disclosure provide an optical phased array chip with a contra-directional coupler, being able to not only achieve an on-chip phase calibration, but also reduce a spacing between emitting elements, further increase a rotation angle range of an OPA. At a same time, it is also beneficial to reduce a size of the chip and lower a cost. The optical phased array chip with the contra-directional coupler comprises: m levels of beam splitting section, each level of the beam splitting section comprises an optical splitter group and an optical waveguide branch group; each optical splitter in each level of the optical splitter group is configured to divide an optical signal into an N-channel output signal; after splitting the light at least once, an m-th level of the optical waveguide branch group comprises N paths of first optical waveguide branch, applied to transmitting the N-channel output signal.

In an embodiment, the optical splitter may be a 1×2 cascade, may also be a 1×3 cascade, or even a 1×4 cascade, and the optical splitter may further be a star coupler of 1×M. Assuming that the optical splitter in the present embodiment is 1×2, then shown as FIG. 3, each optical splitter in each level of the optical splitter group is configured to divide an optical signal into a 2-channel output signal; when m is larger than 1, a branch number of the optical waveguides in a rear level of the light splitting section is twice branch number of the optical waveguides in a previous level of the light splitting section; wherein an m-th level of the optical splitter group splits a $2^{m-1}$-channel output signal coming from the m−1-th optical splitter group into a $2^{m}$-channel output signal.

In the present embodiment, an m-th level of the optical waveguide branch group comprises N paths of first optical waveguide branch, configured to transmit an N-channel output signal; each path of the first optical waveguide branch in the m-th level of the optical waveguide branch group has a thermo-optical phase shifter arranged, and an end of each path of the optical waveguide branch in the m-th level of the optical waveguide branch group has an emitting element connected; an upper layer or a lower layer of each path of the optical waveguide branch in the m-th level of the optical waveguide branch group has at least one contra-directional coupler arranged, the contra-directional couplers in two paths of the first optical waveguide branches combine light by two paths of second optical waveguide branches and form an interferometer structure, and the interferometer structure is configured to transmit an optical signal after being combined and interfered to a detector for a phase calibration. Each path of the first optical waveguide branch in the m-th level of optical waveguide branch group has a thermo-optical phase shifter arranged; or each path of the first optical waveguide branch in each level of the optical waveguide branch group has a thermo-optical phase shifter arranged, wherein the first optical waveguide branch and the second optical waveguide branch are locating in different layers in a space.

Figure 3:
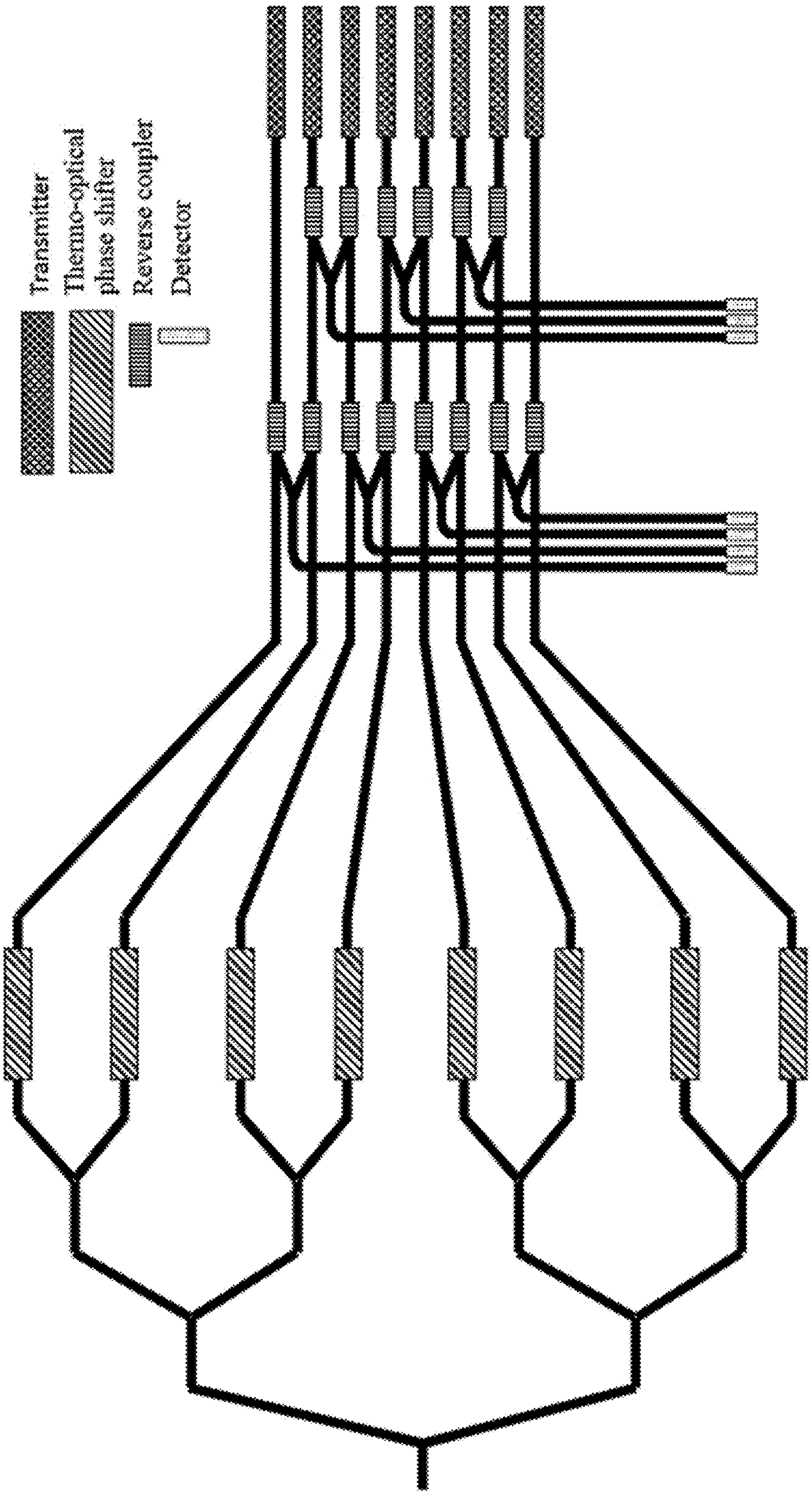
FIG. 3 illustrates a schematic diagram on an optical phased array chip having an on-chip phase calibration function according to a plurality of embodiments of the present disclosure.
Figure 4:
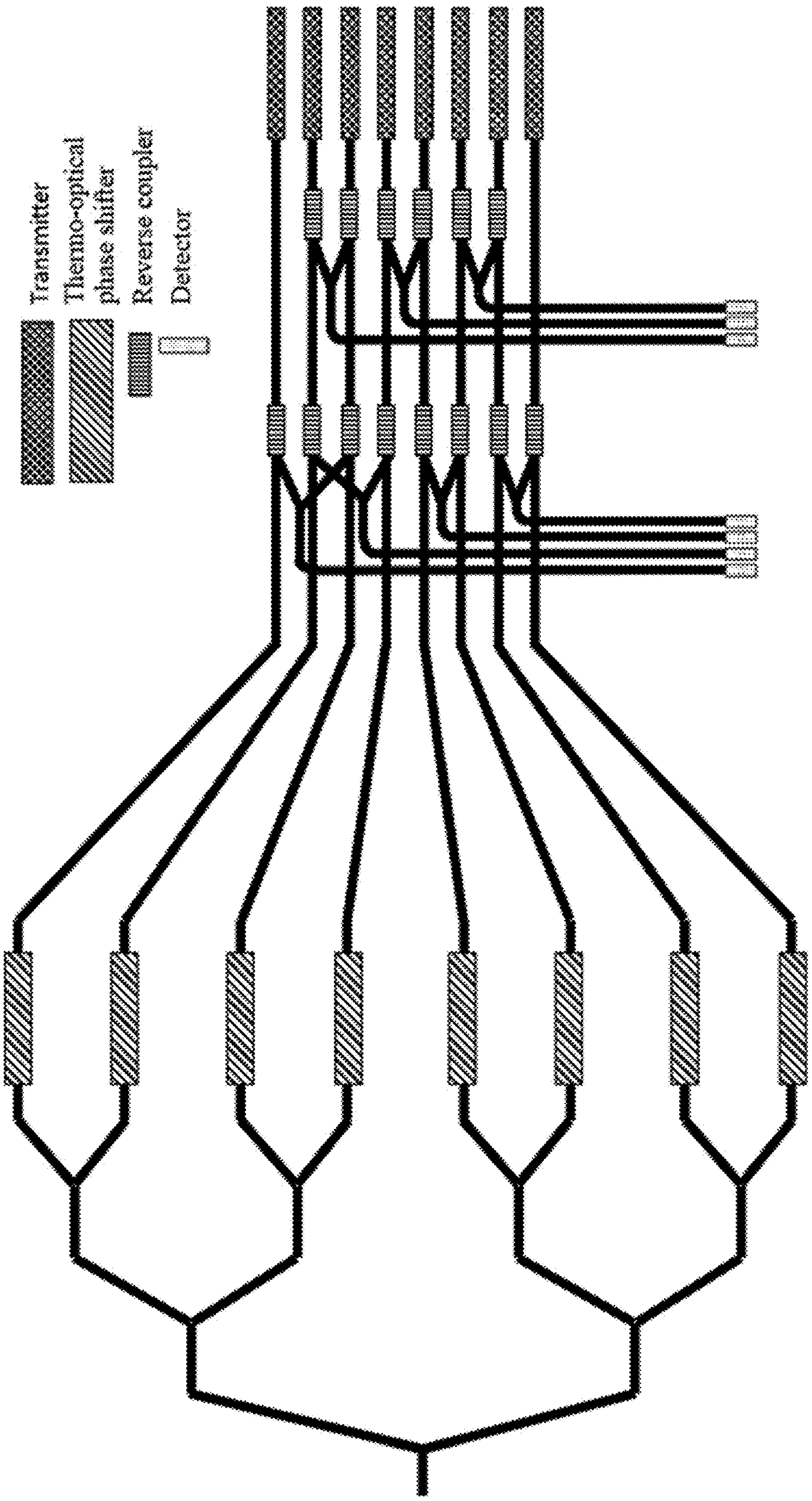
FIG. 4 illustrates a schematic diagram on an optical phased array chip having an on-chip phase calibration function according to a plurality of other embodiments of the present disclosure.

In an embodiment, shown as FIG. 3, a third optical waveguide branch group comprises eight paths of the first optical waveguide branches, the eight paths of the first optical waveguide branches are each having a thermo-optical phase shifter arranged, each end of the eight optical waveguide branches is connected to an emitting element, an upper layer of the eight optical waveguide branches has at least one contra-directional coupler arranged, the contra-directional couplers on the upper layers of two adjacent paths of the first optical waveguide branches combine light by two paths of the second optical waveguide branches and form an interferometer structure, the interferometer structure further transmits the optical signal after being combined and interfered to the detector to perform the phase calibration. It should be understood that, the contra-directional couplers of any two paths of the first optical waveguide branches are able to combine light by two paths of the second optical waveguide branches and form an interferometer structure. In an embodiment, shown as FIG. 4, from top down, the contra-directional couplers on the upper layers of the first optical waveguide branches secondary adjacent to each other are able to combine light by two paths of the second optical waveguide branches and form an interferometer structure. Further, the contra-directional coupler on the upper layer of the first optical waveguide branch may be arranged more than one, while a specific number may be arranged according to an actual requirement, as long as a purpose of adjusting all phases of the emitting elements to be consistent is finally achieved.

Figure 5:
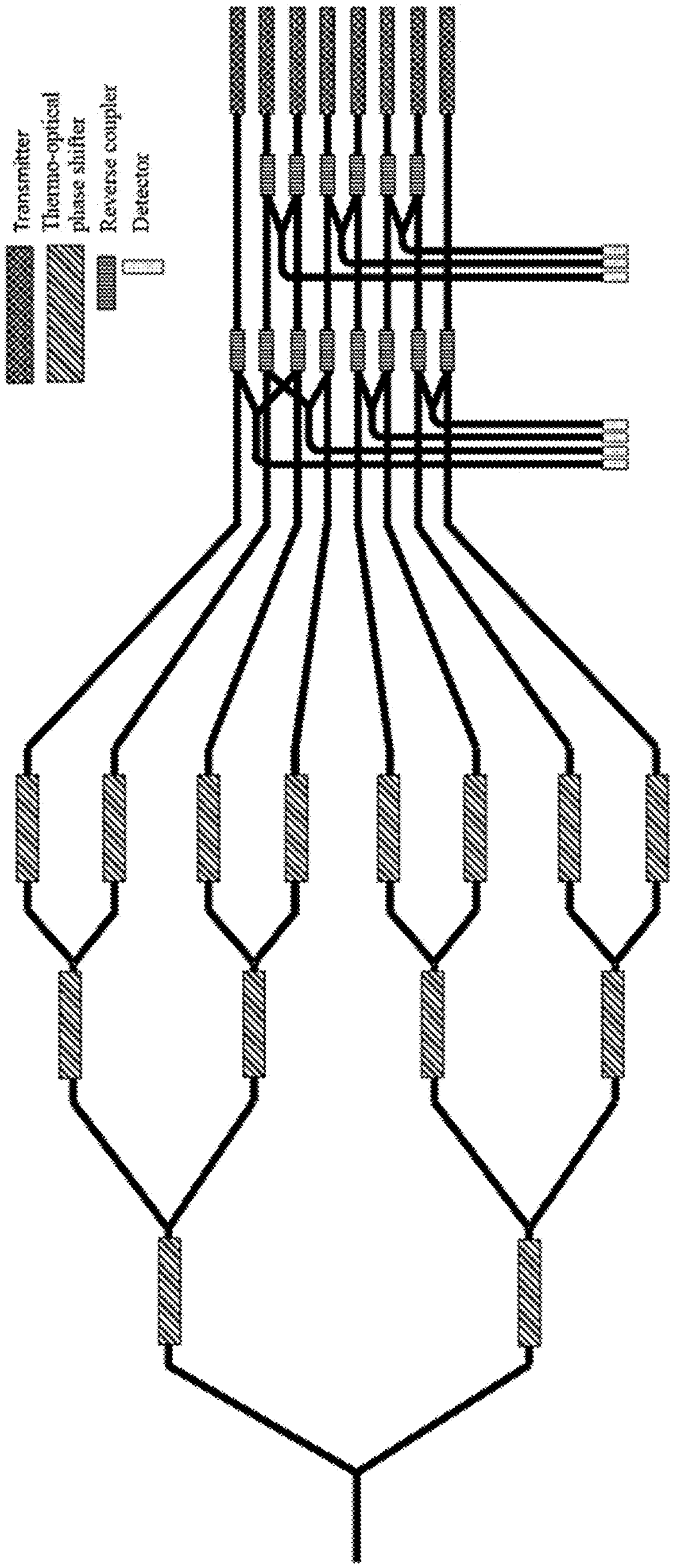
FIG. 5 illustrates a schematic diagram on an optical phased array chip having an on-chip phase calibration function according to a plurality of more embodiments of the present disclosure.

In one more embodiment, shown as FIG. 5, each first optical waveguide branch in each level of the optical waveguide branch group has a thermo-optical phase shifter arranged, the first level of the optical waveguide branch group comprises two paths of the first optical waveguide branches, each of the two paths of the first optical waveguide branches has a thermo-optical phase shifter arranged; a second level of the optical waveguide branch group comprises four paths of the first optical waveguide branches, each of the four paths of the first optical waveguide branches has a thermo-optical phase shifter arranged; a third level of the optical waveguide branch group comprises eight paths of the first optical waveguide branches, each of the eight paths of the first optical waveguide branches has a thermo-optical phase shifter arranged; each end of the eight paths of the optical waveguide branches in the third level of the optical waveguide branch group has an emitting element connected, each upper layer of the eight paths of the optical waveguide branches has at least one contra-directional coupler arranged, the contra-directional couplers on the upper layers of two adjacent paths of the first optical waveguide branches combine light by two paths of the second optical waveguide branches and form an interferometer structure, the interferometer structure further transmits the optical signal after being combined and interfered to the detector to perform the phase calibration. Similarly, the two contra-directional couplers applied for coupling may be, or may not be adjacent, which is not specifically limited.

Figure 2:
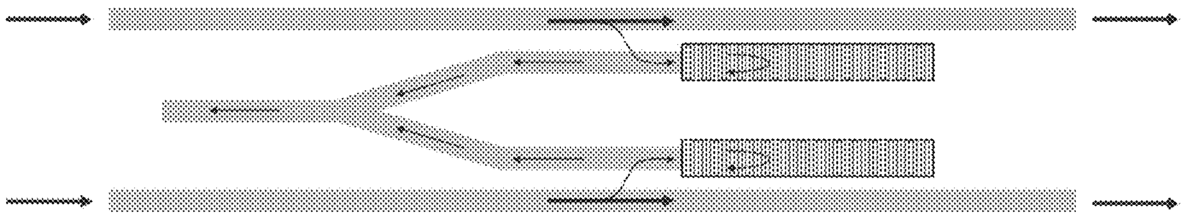
FIG. 2 illustrates a schematic diagram on an optical path direction and a working principle in an interferometer of an optical phased array chip in the prior art.
Figure 6:
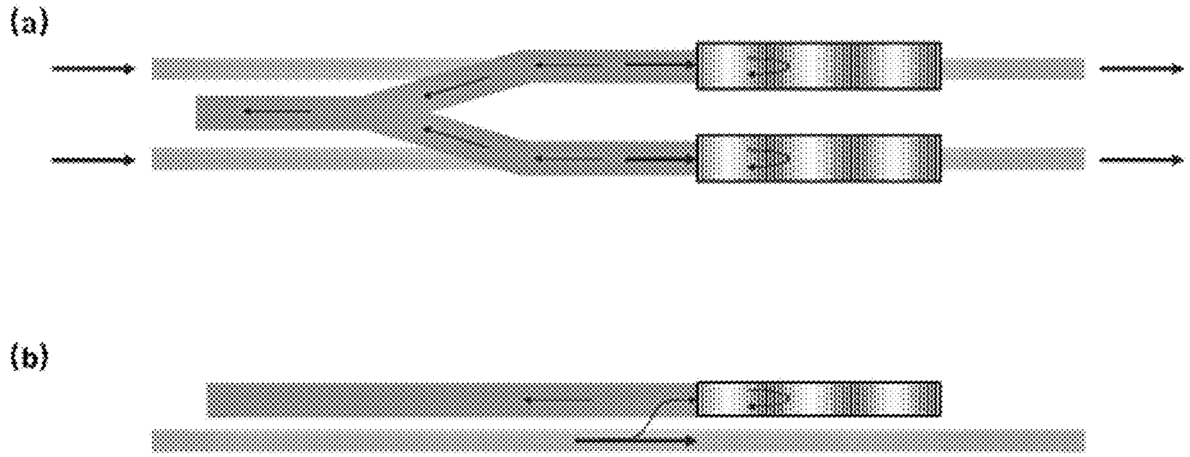
FIG. 6 illustrates a schematic diagram on a working principle of a contra-directional coupler according to a plurality of embodiments of the present disclosure.
Figure 7:
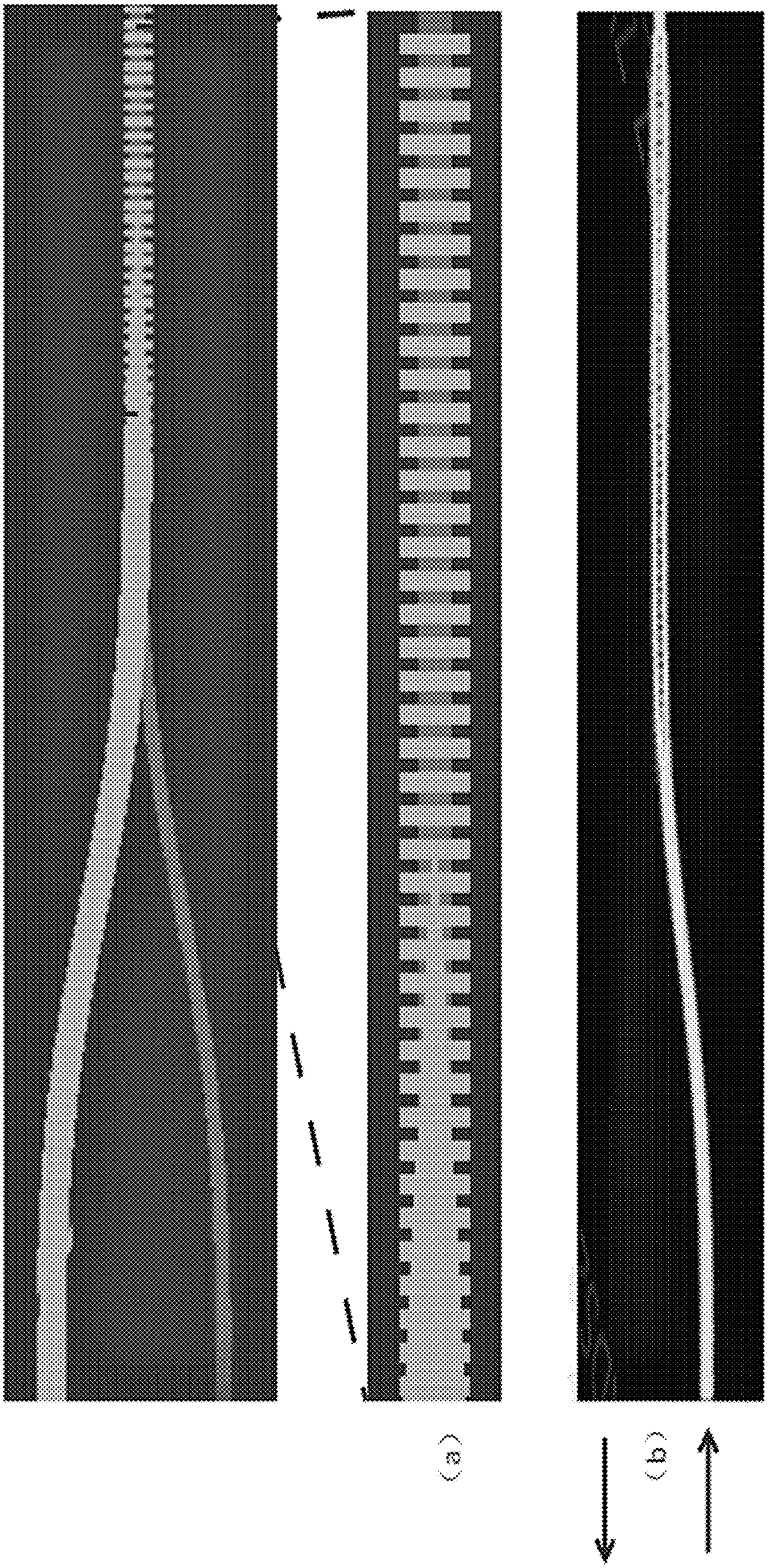
FIG. 7 illustrates a schematic diagram on a structure illustration (top view) and a simulation result of a contra-directional coupler according to a plurality of embodiments of the present disclosure.

For an arrangement manner of the contra-directional coupler, in an embodiment, a top view and a side view shown in FIG. 6 have shown a working principle of the contra-directional coupler. It can be seen from the side view shown in FIG. 6 that, the present contra-directional coupler and the first optical waveguide branch are in two layers different to each other, and the two layers may be made of different materials (such as silicon and silicon nitride). It can be seen that, compared to the prior art, an optical coupling has been changed from coupling along a horizontal direction in a same plane (shown as FIG. 2) into coupling along a vertical direction in different planes. An illustration on a structure of the inverse coupler (top view) and a simulation result are shown in (a) of FIG. 7 and (b) of FIG. 7 in a sequence. A main body of the contra-directional coupler is composed of a grating, and there is a transition region between a conventional waveguide and the grating. The grating has a multi-layer structure, the first optical waveguide is on a lower layer, grating ripples are on an upper layer, and a reflected light will enter the second optical waveguide in the upper layer.

Figure 8:
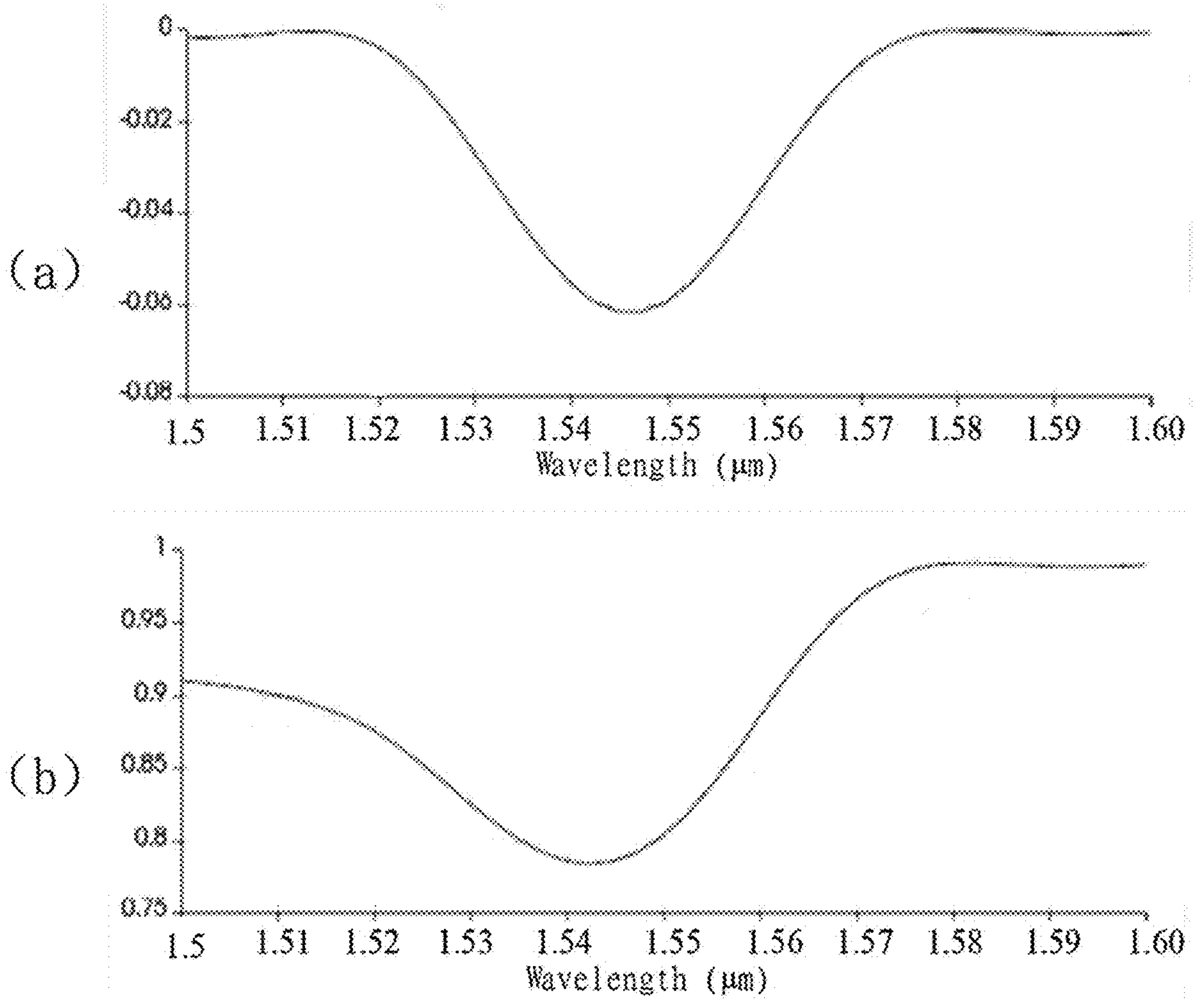
FIG. 8 illustrates an experimental data graph on a reflection spectrum and a transmission spectrum of a contra-directional coupler according to a plurality of embodiments of the present disclosure.

(a) of FIG. 8 illustrates a reflection spectrum simulation data graph of the contra-directional coupler, and (b) of FIG. 8 illustrates a transmission spectrum simulation data graph of the contra-directional coupler. It can be seen that, approximately 6% of the light is reflected for the phase calibration; and around 80% of the light is transmitted. In the present embodiment, a design size of the contra-directional coupler is: a width of a lower Silicon waveguide is 0.5 μm, a width of an upper Silicon Nitride waveguide is 1 μm, a period of the grating is 0.395 μm, a duty ratio of the grating is 0.237, and a length of the grating is 10 μm.

In a possible embodiment, a position where the contra-directional coupler is placed shall be close to the emitting element as much as possible, so that a phase detected by the contra-directional coupler is as close as possible to a phase of an actually emitted light.

It should be noted that, in the embodiments stated above, a number of the waveguides of the OPA is 8. In a real application, the number of the waveguides of the OPA is not limited to 8 only, but can be any one number N, N>=2, and N is usually an even number. In a summary, the number of the waveguides of an OPA is N, comprising the first level of the waveguide branch group to an m-th level of the waveguide branch group, and the m-th level of the waveguide branch group comprises N paths of the first optical waveguide branches, the N paths of the first optical waveguide branches are arranging N thermo-optical phase shifters sequentially and correspondingly, and each end of the N paths of the first optical waveguide branches has an emitting element connected; the upper layers or the lower layers of the N paths of the first optical waveguide branches have at least one contra-directional coupler arranged, the contra-directional couplers on two paths of the first optical waveguide branches combine light by two paths of the second optical waveguide branches to form an interferometer structure, The interferometer structure further transmits the optical signal having been combined and interfered to the detector for a phase calibration.

Figure 9:
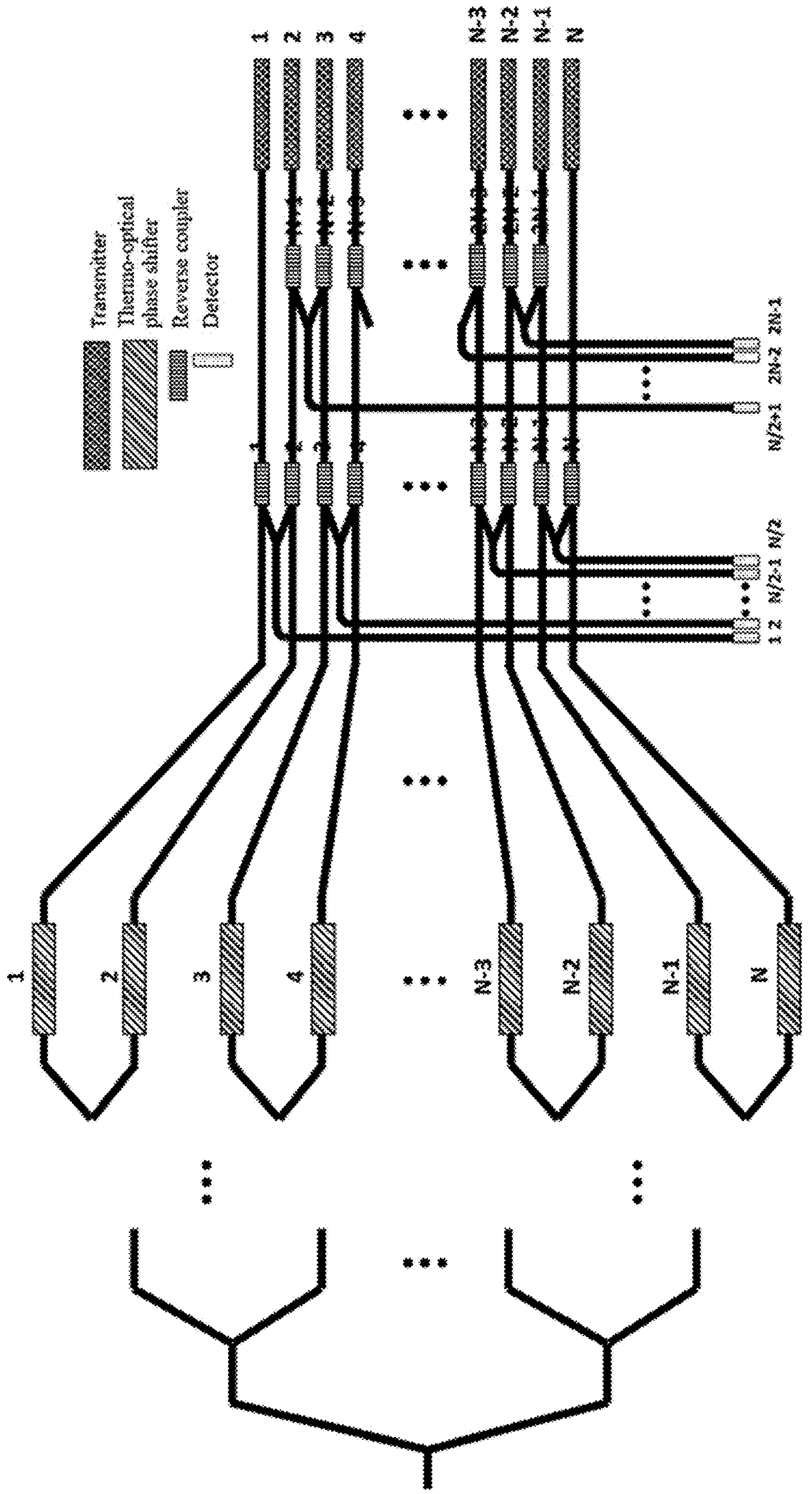
FIG. 9 to FIG. 11 illustrate three schematic diagrams on an optical phased array chip having an on-chip phase calibration function in a plurality of other embodiments of the present disclosure.

In an embodiment, as shown in FIG. 9, the upper layers of the N paths of the first optical waveguide branches have 2 N−2 contra-directional couplers arranged, and the interferometer structure transmits the optical signal having been combined and interfered to N−1 detectors. During performing the phase calibration, first, a thermal-optical phase shifter 1 is adjusted to set an initial phase of an emitting element N, the initial phase will be act as a reference, and a plurality of phases of other emitting elements will be adjusted to be consistent with the reference. Then, a thermo-optical phase shifter 2 is adjusted, so that an interference signal between two lights reflected by the contra-directional coupler 1 and the contra-directional coupler 2 and detected by the detector 1 is a maximum, thus phases of the emitting element 1 and the emitting element 2 are calibrated consistent. Then, a thermo-optical phase shifter 3 is adjusted so that an interference signal between two paths of a light reflected by a contra-directional coupler N+1 and a contra-directional coupler N+2 being detected by a detector N/2+1 is a maximum, thus the phase of the emitting element 2 and a phase of the emitting element 3 are calibrated consistent, (that is, being consistent with the phase of the emitting element 1). Then, a thermo-optical phase shifter 4 is adjusted so that an interference signal between two paths of a light reflected by a contra-directional coupler 3 and a contra-directional coupler 4 being detected by a detector 2 is a maximum, thus the phase of the emitting element 3 and a phase of the emitting element 4 are calibrated consistent, (that is, being consistent with the phase of the emitting element 1). Similarly, the thermo-optical phase shifter in each path is adjusted in a sequence, so that the phases of the emitting elements in every two adjacent paths are consistent. Finally, the phases of the emitting elements from the emitting element 1 to the emitting element N are calibrated consistent. It should be understood that, FIG. 9 is illustrated by using the N as an even number, and in a real application, when the optical splitter is a coupler of 1×M (such as a star coupler), the N of the N paths of the first optical waveguide branches may be an odd number, which is not illustrated in a plurality of embodiments herein.

Figure 10:
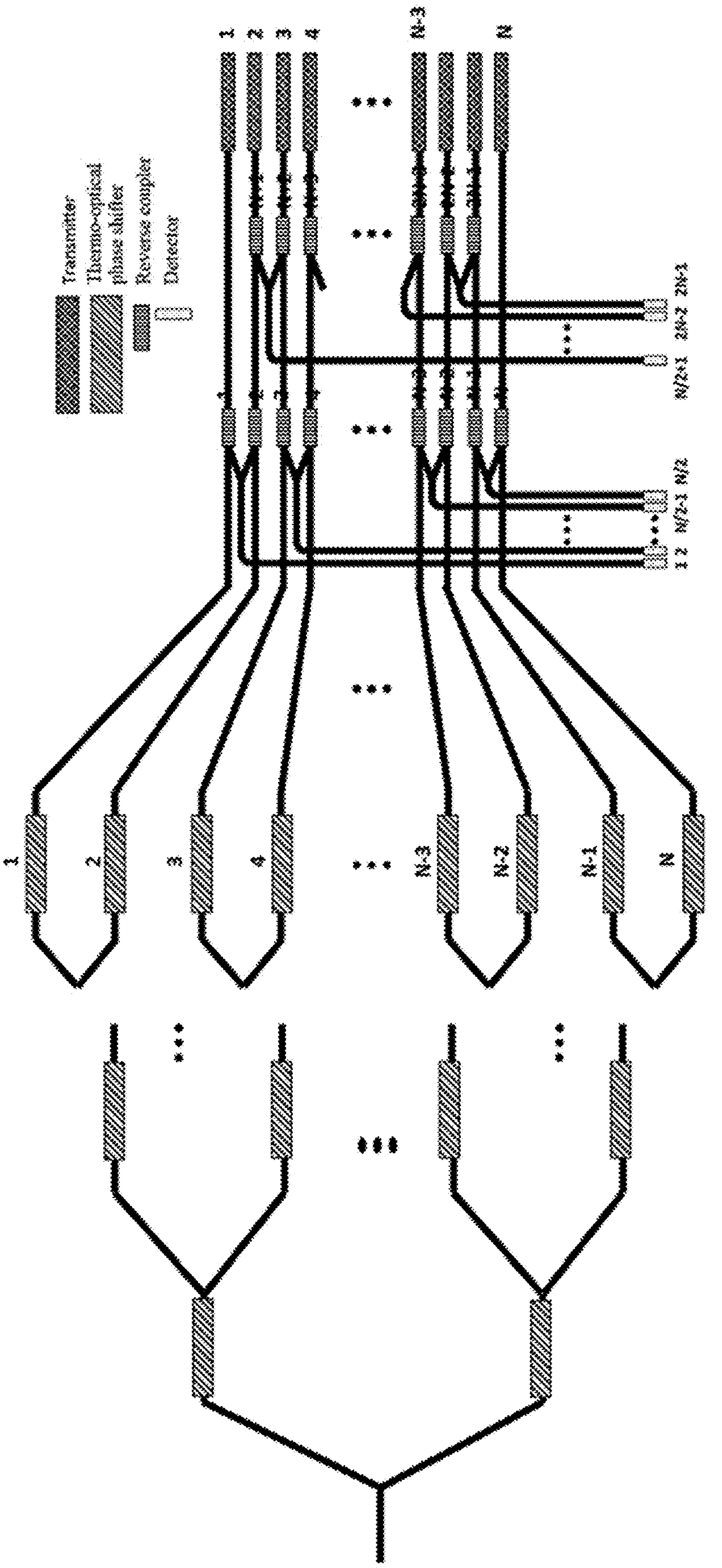

In one more embodiment, shown as FIG. 10, each path of the first optical waveguide branch in each level of the optical waveguide branch group has a thermo-optical phase shifter arranged, from the first level of the optical waveguide branch group to the m-th level of the optical waveguide branch group, each has a thermo-optical phase shifter arranged, while a plurality of remaining structures are similar to those in FIG. 9, no more details are stated herein.

Figure 11:
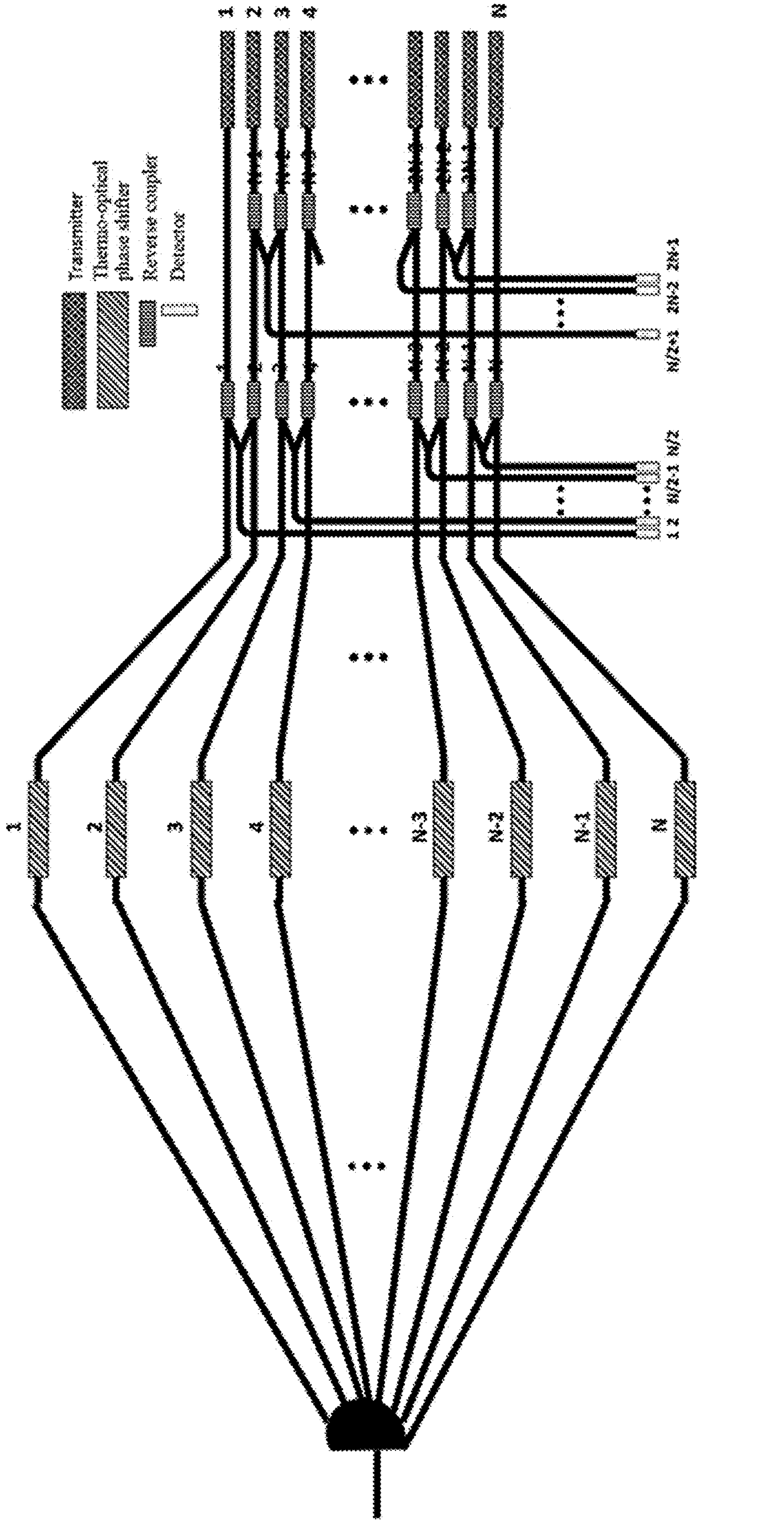

In a further embodiment, shown as FIG. 11, the optical splitter is a star coupler of 1×M, a coming light is split by the star coupler before forming N paths of the first optical waveguide branches, while a plurality of remaining structures are similar to those in FIG. 9, no more details are stated herein.

Based on the architecture stated above, the present disclosure further provides an optical phased array system, comprising a control circuit and a light source, the optical phased array chip stated above, an optical component system, a mechanical structure component, and a thermal component, the control circuit is connected to the light source, the optical phased array chip, the optical component system, the mechanical structure component, and the thermal component, respectively, configured to control a light emission and an optical phase.

Based on the architecture stated above, the present disclosure further provides an on-chip phase calibration method, comprising: setting an initial phase of an emitting element connecting to an end of at least one optical waveguide branch as a reference phase; adjusting sequentially a thermal-optical phase shifter in each remaining path of the optical waveguide branches, and detecting an output signal of an interferometer connected to the contra-directional coupler, so that a phase of the emitting element in each remaining path of the thermal-optical phase shifters is consistent with the reference phase. An embodiment may reference to FIG. 9, and no more detail is stated herein.

In a plurality of embodiments, an integrated material platform where the optical phased array chip is located comprises at least one of Bulk Silicon, Silicon-On-Insulator, Silicon-On-Sapphire, Silicon Dioxide, Aluminum Oxide, Indium Phosphide, Lithium Niobate, Barium Titanate and a polymer thereof. In a plurality of embodiments, a type of the waveguide in the first optical waveguide branch is a channel waveguide, a ridge waveguide, a slot waveguide, a diffusion waveguide or a photonic crystal waveguide.

In a plurality of embodiments, a range of a working wavelength of the phased array comprises at least one of a visible light band, an O band, an E band, an S band, a C band, an L band, a U band, and a mid-infrared band.

In a plurality of embodiments, the working wavelength of the phased array may be a same fixed wavelength, or may be an adjustable wavelength.

In a plurality of embodiments, an implementation form of the optical splitter in the optical splitter group comprises at least one of a Y-shaped branch, a trident branch, a multimode interferometer, a directional coupler, an adiabatic coupler, a bent coupler, a star coupler, a photonic crystal splitter, and a sub-wavelength splitter; a light split ratio thereof may be 50/50 or more.

In a plurality of embodiments, a material of a heating resistor in the thermo-optical phase shifter comprises Titanium Nitride, doped Silicon or Tungsten, and a position of the heating resistor may locate above, below, or on a side of the optical waveguide; and a waveguide routing shape of the phase shifter may be at least one of a straight waveguide, a spiral type, or a folded type In a plurality of embodiments, an architecture of the phase shifter may also be cascaded, so that a phase change is in a linear relationship with a control voltage.

In a plurality of embodiments, the contra-directional coupler comprises at least one of a partially-etched or fully-etched grating, a strip-shaped grating, a sawtooth grating, a nano-beam grating, a photonic crystal grating, and a multi-layer structure grating; the contra-directional coupler may locate on an upper layer of the first optical waveguide branch, or a lower layer.

In a plurality of embodiments, an implementation form of an optical combiner in the interferometer structure comprises at least one of a Y-shaped branch, trident branch, a multimode interferometer, a directional coupler, an adiabatic coupler, a bent coupler, a star coupler, a photonic crystal splitter, and a sub-wavelength splitter.

In a plurality of embodiments, the detector comprises one of a semiconductor photodetector, a metal photodetector, a metal-semiconductor photodetector, an avalanche photodetector, and more; an incident waveguide of the detector may be a normal incidence or an adiabatic incidence.

In a plurality of embodiments, a winding direction of the waveguide connecting the interferometer and the detector may be arbitrary and not limited to that shown in the figures In a plurality of embodiments, a grating structure of the emitting element comprises at least one of a partially-etched or fully-etched grating, a strip-shaped grating, a sawtooth grating, a nano-beam grating, a photonic crystal grating, and a multi-layer structure grating and more, the grating may be composed by a material in one layer, or may be composed by a material in two layers or more.

In a plurality of embodiments, a number of the waveguides in the phased array is not limited to eight as shown in the figures, but may further be any numbers.

In a plurality of embodiments, an application field of the phased array comprises a laser radar, imaging, a laser ranging, a free-space optical communication, a beam control, an optical sensing, an optical interconnection and more.

While the embodiments of the present application have been described in detail above, it will be apparent to those skilled in the art that various modifications and variations can be made to the embodiments. It should be understood, however, that such modifications and variations are within the scope and spirit of the present application as set forth in the claims. Moreover, the present application described herein is capable of other embodiments and of being practiced or of being carried out in various ways.

What is claimed is:

1. An optical phased array chip with a contra-directional coupler, comprising:

m levels of beam splitting section, each level of the beam splitting section comprises an optical splitter group and an optical waveguide branch group; each optical splitter in each level of the optical splitter group is configured to divide an optical signal into an N-channel output signal;

an m-th level of the optical waveguide branch group comprises N paths of first optical waveguide branch, configured to transmit the N-channel output signal; each path of the first optical waveguide branch in the m-th level of the optical waveguide branch group is arranged with a thermo-optical phase shifter, and an end of each path of the optical waveguide branch in the m-th level of the optical waveguide branch group is connected to an emitting element;

an upper layer or a lower layer of each path of the optical waveguide branch in the m-th level of the optical waveguide branch group is arranged with at least one contra-directional coupler, wherein the contra-directional coupler is vertically coupled with the optical waveguide branch and back-reflects some light from main forward emission light in the optical waveguide branch to the upper layer or lower layer, the contra-directional couplers in two paths of the first optical waveguide branch combine light by two paths of second optical waveguide branch and form an interferometer structure, and the interferometer structure is configured to transmit an optical signal after being combined and interfered to a detector for a phase calibration, wherein the first optical waveguide branch and the second optical waveguide branch are located in different layers in a space, and the second optical waveguide branches for the interferometer structure do not occupy lateral spacing between adjacent emitting elements on the same layer as the first optical waveguide branch.

2. The optical phased array chip according to claim 1, wherein each path of the first optical waveguide branch in the m-th level of optical waveguide branch group is arranged with a thermo-optical phase shifter; or each path of the first optical waveguide branch in each level of the optical waveguide branch group is arranged with a thermo-optical phase shifter.

3. The optical phased array chip according to claim 1, wherein a position of each contra-directional coupler is close to the emitting element, configured to keep an optical phase detected by the contra-directional coupler consistent with an optical phase actually emitted by the emitting element.

4. The optical phased array chip according to claim 1, wherein the contra-directional coupler comprises a grating structure.

5. The optical phased array chip according to claim 4, wherein the contra-directional coupler comprises at least one of a partially-etched or fully-etched grating, a strip-shaped grating, a sawtooth grating, a nano-beam grating, a photonic crystal grating, and a multi-layer structure grating.

6. The optical phased array chip according to claim 1, wherein an implementation form of the optical splitter in the optical splitter group comprises at least one of a Y-shaped branch, a trident branch, a multimode interferometer, a directional coupler, an adiabatic coupler, a bent coupler, a star coupler, a photonic crystal splitter, and a sub-wavelength splitter.

7. The optical phased array chip according to claim 1, wherein a material of a heating resistor in the thermo-optical phase shifter comprises Titanium Nitride, doped Silicon or Tungsten; a position of the heating resistor is located above, below, or on a side of the optical waveguide; and a waveguide routing shape of the phase shifter is at least one of a straight waveguide, a spiral type, and a folded type.

8. The optical phased array chip according to claim 1, wherein an implementation form of an optical combiner in the interferometer structure comprises at least one of a Y-shaped branch, a trident branch, a multimode interferometer, a directional coupler, an adiabatic coupler, a bent coupler, a star coupler, a photonic crystal splitter, and a sub-wavelength splitter.

9. An optical phased array system, comprising a control circuit and a light source, the optical phased array chip according to claim 1, an optical component system, a mechanical structure component, and a thermal component, the control circuit is connected to the light source, the optical phased array chip, the optical component system, the mechanical structure component, and the thermal component, respectively, configured to control a light emission and an optical phase.

10. An on-chip phase calibration method, applied to the waveguide optical phased array system according to claim 9, comprising:

A, setting an initial phase of an emitting element connecting to an end of at least one optical waveguide branch as a reference phase;

B, adjusting sequentially a thermo-optical phase shifter in each remaining path of the optical waveguide branches, and detecting an output signal of an interferometer connected to the contra-directional coupler, until a phase of an emitting element in each remaining path of the thermo-optical phase shifters is consistent with the reference phase.

* * * * *